2,804,372

PRODUCTION OF BERYLLIUM FLUORIDE

Simon J. Morana and Gordon F. Simons, Reading, Pa., assignors to The Beryllium Corporation, Reading, Pa., a corporation of Delaware No Drawing. Application September 28, 1955, Serial No. 537,286

9 Claims. (Cl. 23—88)

This invention relates to a new and improved process for preparing beryllium fluoride.

Beryllium fluoride as produced according to prior processes, is of a high melting point, and when melted is quite tacky and viscous and very difficult to pour. Furthermore, prior processes have a lengthy time cycle of approximately 36 hours which is, of course, a retarding factor as to productivity adding appreciably to overall costs.

Accordingly, one object of the present invention is to provide a new process of preparing beryllium fluoride having a lower melting point and which, when melted is very fluent and easy to pour.

More specifically, a further object of the present invention is to utilize in the present process a halide salt to effect the desired lowering of the melting point of the product and its desired flowable characteristics.

A further object of the present invention is to provide a new and improved process of preparing beryllium fluoride wherein the time cycle of production is materially shortened.

Another object of the present invention is to provide a new and improved beryllium fluoride product wherein the same is a dense, brittle, glass-hard solid.

These and other objects will become apparent from the following.

A present process of producing beryllium fluoride entails the use of equal mols of beryllium oxide and ammonium bifluoride with a 10% excess of the bifluoride to produce beryllium fluoride according to the following equation:

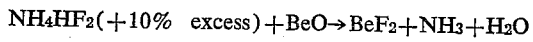

$NH_4HF_2(+10\% \text{ excess}) + BeO \rightarrow BeF_2 + NH_3 + H_2O$

Beryllium fluoride as produced by this process has a melting point of 800° C. and when melted is quite tacky and viscous.

It has been found that small additions of certain halide salts to the beryllium fluoride, or to the reactants, the beryllium oxide and the ammonium bifluoride when the latter are mixed together, materially lowers the melting point of the beryllium fluoride and also makes it very fluent and easy to pour at a lower temperature into pig molds for storage.

As an example, it is found that the addition of common salt ($NaCl_2$) to the $BeF_2$ in the approximate proportion of 15 pounds of salt to 100 pounds of $BeF_2$ results in lowering the melting point of the beryllium fluoride and makes it fluent and readily pourable.

The major use for beryllium fluoride is in the preparation of metallic beryllium, which is obtained by reducing the $BeF_2$ with magnesium. In this reaction, the by-product consists of a salt mixture of magnesium fluoride with small amounts of unreacted $BeF_2$, which by-product is termed "Spent Salt."

It has been found that similar desirable results are obtained by the use, in a slightly different proportion, of "Spent Salt." While the fluent and pourable characteristic of the $BeF_2$ is obtained with the use of both salts stated, the use of the "Spent Salt" is preferred in order to avoid the effect of a ternary salt in the reaction product. It has been found that the addition of approximately 20 pounds of "Spent Salt" to 100 pounds of $BeF_2$ similarly produces a beryllium fluoride that can be readily poured at a temperature of 800–850° C.

It has also been found that the time cycle of the foregoing described method as well as the time cycle of the prior art methods of producing beryllium fluoride may be materially shortened, by pre-mixing equal mols of technical grade beryllium oxide and ammonium bifluoride and adding this mixture together with the proportionate amount of "Spent Salt" periodically, or portionwise, into a suitable Monel crucible which is maintained at 700–750° C. during the reaction, then increasing the temperature to 800–900° C. The product is fluent and solidifies to a dark gray, dense, glass-hard solid with no visible unreacted particles of BeO after pouring into a mold. The complete time cycle is approximately 5 hours as compared to the customary 36 hours of prior methods. The pre-mixing operation is best carried out by uniformly wetting the oxide with one-third its weight of water, then adding the ammonium bifluoride crystals while intimately mixing the same.

The denser, more brittle solid obtained by this preferred method is more desirable than the tough, sponge-like fluoride obtained by baking the reaction mixture at 600° C. for 36 hours because it can more easily be crushed into smaller pieces and blended with magnesium pieces in the subsequent end use for the production of beryllium metal. Furthermore, when magnesium is added to the low density sponge-like fluoride in the end use for production of the beryllium metals the results are not uniform as to quantity of beryllium obtained. The hard, dense product of the present process yields uniform metal quantities. Using the new improved process, the reaction products are heated at 800–900° C. for only about 5 hours and are poured as a liquid.

The following example is given as illustrative of the pilot plant production using the new improved process:

|  | Pounds |
|---|---|
| Commercial grade BeO | 80 |
| Water | 25 |
| $NH_4HF_2$ | 200 |
| Spent Salt | 35 |

The BeO, water and ammonium bifluoride are blended mechanically, and the reaction mixture is shoveled portionwise into a heated Monel crucible which is maintained at 800–900° C. throughout the run. The reaction is completed and the liquid product is poured 5 hours after the first charge is added. The product after cooling weighs 188 lbs., which is very close to the calculated amount.

It may be seen, therefore, that a new and improved process for producing beryllium fluoride by a shortened time cycle has been developed and additionally a new and improved product as well has been produced.

Since Monel metal is generally unaffected by fluorides, it is possible to prepare a high purity $BeF_2MgF_2$ fused salt by the above process with the use of high purity BeO in place of commercial grade BeO. In the operation of reducing the $BeF_2$ by magnesium, if high purity $BeF_2$ is employed to produce the metal, the "Spent Salt" would of necessity be high purity. The addition of $MgF_2$ from the "Spent Salt" does not make the beryllium fluoride less desirable, because $MgF_2$ is formed in the ultimate reduction step anyway.

Halide salt additions to fluidize beryllium fluoride may similarly be used with beneficial results in conjunction with the preparation of beryllium fluoride by decomposition of ammonium beryllium fluoride

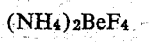

crystals or in fact any other beryllium fluoride containing compound.

It will be seen from the foregoing that the present invention provides a process of producing beryllium fluoride wherein the beryllium fluoride is fluent and easily poured at the melting point thereof rather than being tacky and viscous during the pouring thereof as in the heretofore practical processes. Additionally there is provided a new and improved process of producing beryllium fluoride wherein the time cycle of producing the same is materially shortened and wherein a new and improved product is produced thereby.

Having described the invention, we claim:

1. A method of producing beryllium fluoride characterized by being fluent and easily pourable at its melting point comprising pre-mixing substantially equal mols of beryllium oxide and ammonium bifluoride, then adding this mixture together with a salt mixture consisting essentially of magnesium fluoride with small amounts of beryllium fluoride into a crucible maintained at 700–750° C. during the reaction, then subsequently increasing the temperature thereof to 800–900° C.

2. A method of producing beryllium fluoride as described in claim 1 wherein the entire time cycle is approximately 5 hours.

3. A method of producing beryllium fluoride as defined in claim 1 wherein the composition ratio is approximately 80 pounds beryllium oxide to 200 pounds ammonium bifluoride to 35 pounds salt mixture.

4. The product as produced by the method set forth in claim 1 characterized by being a dense brittle and glass-hard solid with no visible unreacted particles of BeO after pouring.

5. The method of preparing beryllium fluoride which comprises, mixing substantially equal mols of beryllium oxide and a fluoride compound selected from the group consisting of ammonium beryllium fluoride and ammonium bifluoride and adding thereto a salt selected from the group consisting of (1) sodium chloride and (2) magnesium fluoride with small amounts of beryllium fluoride, heating such mixture to a temperature of from about 800° C. to about 900° C. and maintaining the fused liquid thus formed at such temperature for about five hours, and cooling the fused liquid to form a solidified mass which is predominantly beryllium fluoride.

6. The method of preparing beryllium fluoride which comprises, mixing approximately 80 parts by weight of beryllium oxide, approximately 200 parts by weight of ammonium bifluoride and approximately 35 parts by weight of a salt mixture containing predominantly magnesium fluoride with small amounts of beryllium fluoride, heating such mixture to a temperature of from about 800° C. to about 900° C. and maintaining the fused liquid thus formed at such temperature for about five hours, and cooling the fused liquid to form a solidified mass which is predominantly beryllium fluoride.

7. The method of preparing beryllium fluoride which comprises, mixing substantially equal mols of beryllium oxide and a fluoride compound selected from the group consisting of ammonium beryllium fluoride and ammonium bifluoride and adding thereto a salt mixture containing predominantly magnesium fluoride with small amounts of beryllium fluoride, heating such mixture to a temperature of from about 800° C. to about 900° C. and maintaining the fused liquid thus formed at such temperature for about five hours, and cooling the fused liquid to form a solidified mass which is predominantly beryllium fluoride.

8. The method of rendering beryllium fluoride fluent and easily pourable at its melting point as defined in claim 5 wherein the salt is magnesium fluoride with small amounts of beryllium fluoride.

9. A method of rendering beryllium fluoride fluent and easily pourable at its melting point as defined in claim 5 wherein the halide salt is sodium chloride.

References Cited in the file of this patent

UNITED STATES PATENTS

| Number | Name | Date |
|---|---|---|
| 1,975,482 | Schulze et al. | Oct. 2, 1934 |
| 1,992,854 | Beja | Feb. 26, 1935 |
| 2,173,290 | Adamoli | Sept. 19, 1939 |
| 2,387,203 | Willmore | Oct. 16, 1945 |
| 2,387,207 | Willmore | Oct. 16, 1945 |
| 2,487,270 | Peterson | Nov. 8, 1949 |